United States Patent [19]
Mitarai et al.

[11] Patent Number: 5,806,483
[45] Date of Patent: Sep. 15, 1998

[54] COMBUSTION METHOD FOR INTERNAL COMBUSTION ENGINE

[75] Inventors: Yukuaki Mitarai, Kamagaya; Takashi Mizusawa, Johetsu; Shigeo Hagino, Tokyo, all of Japan

[73] Assignee: Sumitomo Metal Mining Co., Ltd., Tokyo, Japan

[21] Appl. No.: 855,240

[22] Filed: May 13, 1997

[51] Int. Cl.[6] ............................. F02B 3/00; F02P 23/00
[52] U.S. Cl. ..................... 123/299; 123/298; 123/670; 123/143 B
[58] Field of Search ................... 123/670, 299, 123/300, 305, 295, 298, 143 B

[56] References Cited

U.S. PATENT DOCUMENTS

| | | | |
|---|---|---|---|
| 2,656,830 | 10/1953 | Houdry | 123/670 |
| 2,978,360 | 4/1961 | Bradstreet et al. | 123/670 |
| 3,923,011 | 12/1975 | Pfefferle | 123/143 B |
| 4,092,967 | 6/1978 | Haslett | 123/143 B |
| 4,530,340 | 7/1985 | Totman | 123/670 |
| 4,548,172 | 10/1985 | Bailey | 123/298 |
| 4,811,707 | 3/1989 | Pfefferle | 123/670 |
| 4,972,811 | 11/1990 | Baresel et al. | 123/670 |

*Primary Examiner*—Thomas N. Moulis
*Attorney, Agent, or Firm*—Watson Cole Grindle Watson

[57] ABSTRACT

A combustion method for an internal combustion engine which prevents the occurrence of engine knock and improves fuel consumption and economy, by spray injecting part of the fuel used in one cycle into a combustion chamber, performing preliminary combustion of a diluted air-fuel mixture below combustible limits at a temperature lower than the self-igniting temperature of the fuel, then injecting the remaining fuel into the combustion chamber, and performing main combustion by flame propagation using spark plugs as ignition sources. Accordingly, the combustion method for an internal combustion engine of the present invention can attain stable combustion even at high air-fuel ratios and makes high compression ratios possible.

16 Claims, 2 Drawing Sheets

COMBUSTION METHOD FOR INTERNAL COMBUSTION ENGINE

BACKGROUND OF THE INVENTION

1. Field of the Invention

The present invention relates to a combustion method for internal combustion engine which ignites by means of spark plugs and uses gasoline, methanol, LPG or the like for fuel, and in particular to a combustion method which can prevent the occurrence of knocking even when using a fuel whose ignition temperature is low.

2. Description of the Prior Art

Improvement of the thermal efficiency of gasoline engines, as well as depending on the quantity of heat held in the source fuel being extracted into the pistons during the compression and expansion strokes to produce as much work as possible, also depends on it being extracted from the crank shaft with as little loss as possible. For this reason, using high compression ratios etc. is important. Since the compression ratio is determined mainly by the limitations of knocking, the compression ratio is influenced by a possibility whether knocking can be effectively suppressed.

The mechanism by which knocking occurs is theorized as follows. Knocking is caused by unburnt gas (end gas) of an end portion of flame propagation of an air-fuel mixture spontaneously igniting before the arrival of the flame and explosively combusting. In other words, in gasoline engines, the air-fuel mixture is compressed by the piston rising inside the cylinder in the compression stroke and the air-fuel mixture is ignited in the expectation of an ignition delay and firing delay just before the piston reaches upper dead center. Air and fuel are diffused into the combustion nucleus produced by this ignition to make a flame and the combustion of the air-fuel mixture advances by means of this flame propagation. However, the air-fuel mixture is compressed in its unburnt state due to the flame propagation being delayed or, as a result of this delay, in a fire extinguishing layer or region where the fuel is diluted in the vicinity of the combustion chamber wall. This air-fuel mixture that is compressed in its unburnt state is known as end gas.

Although the gasoline in the end gas is subject to decomposition during the process of the compression stroke to generate aldehydes or the like, the air-fuel mixture containing these is compressed without igniting even if it exceeds the ignition temperature, and ignites and combusts spontaneously regardless of flame propagation during combustion by spark plugs. This combustion is mostly explosive, thereby leading to a sharp rise in pressure that results in knocking.

Consequently, combusting the end gas by normal flame propagation is affective as a measure to prevent knocking. Specifically, (1) Suppressing the compression ratio (to about ½ that of a diesel engine).

(2) Using a high octane gasoline which has a high ignition temperature.

(3) Cooling the wall on the cylinder side in order to decrease the temperature of the fire extinguishing layer and prevent spontaneous ignition of the fire extinguishing layer.

(4) Causing an intense swirl in the cylinder in order to increase the flame propagation speed by means of homonization and agitated flow of the air-fuel mixture.

However, these measures have all been approved on the basis that the generation of end gas is inevitable, and so it can be said that from a fuel consumption viewpoint they are very uneconomical. Apart from the above measures, a method (5) of preventing knocking by providing a catalyst bed on the cylinder walls, cylinder head and the top land surfaces of pistons is known. In other words, by favorably combusting the flame extinguishing layer generated in the vicinity of the wall of the combustion chamber by means of a catalyst, this method prevents explosive spontaneous ignition of the flame extinguishing layer, thus preventing knocking, and further, by selecting the catalyst, reduction of the NOx, HC (Hydrocarbons,) CO, etc. within the combustion gas is possible.

Also, there is a method (6) of preventing knocking by providing a number of combustion chambers, providing spark plugs in each combustion chamber, and synchronizing ignition of the air-fuel mixture in each combustion chamber. However, because engines in which such measures have been adopted also presupposing the generation of end gas, they also sacrifice economy from the view point of fuel consumption in the same way as the above methods (1) to (4). Also, the method of preventing knocking by providing a catalyst bed on the cylinder walls, cylinder head and the top land surfaces of pistons admits all of the fuel used in one cycle in the suction stroke, and the temperature of the catalyst bed rises naturally, therefore the possibility of premature ignition is high, there is a possibility of the power generated by combustion is negative power, and thus it cannot definitely be said that it sufficiently prevents knocking. Also, in the method (6) of providing spark plugs in a plurality of combustion chambers, the structure of the engine is complex and adjustments for synchronization are difficult.

SUMMARY OF THE INVENTION

The present invention was devised in order to solve the above problems of the above prior art knocking prevention measures (1) to (6), and has as its object to provide a combustion method for internal combustion engines which prevents the occurrence of knocking and improves economy by preventing the production of end gas.

The combustion method according to the present invention, as a method of combusting an air-fuel mixture in a combustion chamber, employs a multiple ignition method, and is characterized by injecting part of a fuel used in one cycle into the combustion chamber, combusting (preliminary combustion) diluted air-fuel mixture below combustible limits at a temperature lower than a self-igniting temperature of the fuel, injecting remaining fuel into the combustion chamber immediately thereafter, and combusting (main combustion) by flame propagation using spark plugs as ignition sources. Specifically, it is characterized by taking 1 to 10% of fuel used in one cycle as a dilute air-fuel mixture which is ten or a multiple of ten times a theoretical air-fuel ratio and, immediately prior to the end of a compression stroke which is slightly before a piston reaches the upper dead center, combusting a remaining portion of the fuel immediately prior to injection into a combustion chamber by means of a catalyst bed maintained at a temperature of 300° to 500° C. (preliminary combustion), then immediately thereafter injecting the remaining portion of the fuel into the combustion chamber to ignite and combust it (main combustion).

Also, the present invention is characterized by using a catalyst bed comprising of an active metal, a porous inorganic carrier and a support material as the preliminary combustion means in the above combustion method, and in that the support body is a hedgehog type or labyrinth type.

It is further characterized in that at least one of type from among stainless steel, a ceramic such as Siaron, zirconia or the like, and the porous inorganic carrier is used as the material of the support material, the porous inorganic carrier is mainly comprising of activated alumina or at least one type of heat resistant compound such as $BaAl_{12}O_{19}CaO \cdot 6Al_2O_3$ and $M_xZrO_y$ or the like, and a noble metal or Ni, Co, Cr, Mo, V or the like having similar properties to noble metals is used as the active metal.

BRIEF DESCRIPTION OF THE DRAWINGS

These and other features, aspects and advantages of the present invention will become better understood with reference to the following description, appended claims and accompanying drawings, wherein:

DETAILED DESCRIPTION OF THE INVENTION

Figure 1:
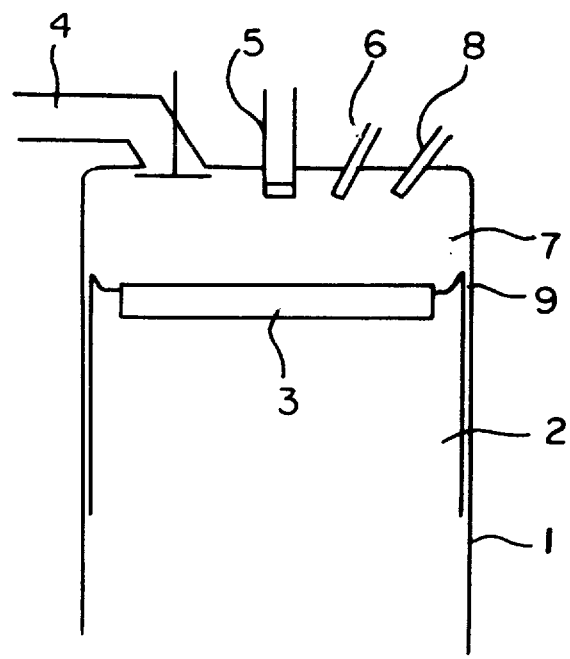
FIG. 1 is an overall view showing an example of an engine for realizing the method of the present invention.

In the preliminary combustion in the present invention, the activation energy of the fuel within the air-fuel mixture is reduced by a combustion catalyst or the like, for example, arises by means of combustion at a temperature lower than its self-igniting temperature and regardless of whether it is a diluted air-fuel mixture below combustible limits. Consequently, the purposes of preliminary combustion and main combustion differ and their combustion conditions also differ. For this reason, in order to facilitate combustion control and not hinder each function thereof, it is preferable to control the preliminary combustion and main combustion separately.

For example, where an engine which provides a catalyst bed in the combustion chamber is used, when the temperature of the catalyst bed becomes too high due to preliminary combustion, the possibility arises of fine control of the ignition timing by the spark plugs during main combustion being disturbed. Also, where the temperature of the catalyst bed becomes too high, since this is a case of excessive fuel being combusted by normal preliminary combustion, negative power becomes too great, making it uneconomical. On the other hand, where the temperature of the catalyst bed is too low, the generation of end gas in the main combustion cannot be prevented. Consequently, again it is preferable to control the preliminary combustion and main combustion separately.

In the preliminary combustion according to the present invention, fuel which is necessary for one cycle and used in the preliminary combustion is injected into the cylinder from nozzles that are attached to the nozzles for injecting fuel during the main combustion, for example. In this case, the air-fuel ratio of the air-fuel mixture in the cylinder is very diluted at ten to a multiple of ten times the theoretical air-fuel ratio, and is below combustible limits. Thus firing and combustion will not occur without an activation means such as a catalyst or the like being used.

In the present invention, the reasons why the amount of fuel required for preliminary combustion is 1 to 10% that of the fuel used in one cycle and the temperature of the catalyst bed is kept within the range of 300° to 500° C. are as follows. The most important purpose of the preliminary combustion is to prevent the generation of end gas which causes knocking by combusting the fuel for preliminary combustion, and because of this it is preferable to maintain the temperature of the catalyst bed within the range of 300° to 500° C. The reason for this is that the temperature of the catalyst bed should be the range in which the preliminary combustion favorably continues. Specifically, although it changes somewhat depending on the catalyst, compression ratio and preliminary combustion fuel amount used, where a noble metal is used as the metal component of the catalyst, generally this is in the order of 300° to 500° C. In other words, where the catalyst bed temperature is low at less than 300° C., preliminary combustion does not continue, but rather results in knocking being generated, while on the other hand, at temperatures exceeding 500° C. the timing of preliminary combustion advances and power loss in the compression stroke increases.

Also, in maintaining the temperature of the catalyst bed at the above 300° to 500° C., it is necessary for to make the amount of fuel required for preliminary combustion 1 to 10% that of the fuel used in one cycle. The reason for this is that if the preliminary combustion fuel is too low at less than 1%, the catalyst bed temperature cannot be maintained within the range of 300° to 500° C. and knocking will occur frequently, while on the other hand if the preliminary combustion fuel exceeds 10% the fuel for main combustion is reduced and only negative effects are imposed on power in the expansion stroke, or negative effects are imposed on power in the compression stroke and reduction of the thermal efficiency of the engine cannot be ignored. Note that although fuel in the air-fuel mixture flow during preliminary combustion can be combusted at 200° C. or less by means of the catalyst used, at this temperature the reaction speed is low and only part of the fuel is combusted, therefore a stable preliminary combustion state cannot be attained.

The catalyst bed in the present invention is constructed in an integrated form (monolith) from a carrier (hereafter referred to as "combustion catalyst") which has a large specific surface area and carries the catalyst metal component, and a support material which supports the catalyst metal component and the combustion catalyst. The shape of the catalyst bed, rather than being flat, is preferably a shape that can maintain a long contact time between the air-fuel mixture and the catalyst surface, for example a hedgehog type or labyrinth type. As the catalyst metal component, a metal that can function as a combustion catalyst is preferred, and although noble metals, Ni, Co, Cr, Mo, V, etc. are suitable, noble metals are most preferable in relation to operating temperature etc. Also, the reason for using at least one type from among stainless steel and a ceramic group such as Siaron, zirconia, etc. as the material for the support member forming the catalyst bed, is to improve mechanical and thermal shocks, reduce the Lewis number, and prevent thermal deterioration of the catalyst due to the emission of flames during main combustion.

Further, the reason for using a material formed mainly by at least one type from among heat-resistant compounds such as activated alumina, $BaAl_{12}O_{19}CaO \cdot 6Al_2O_3$ and $M_xZrO_y$, etc. as the porous inorganic carrier is not only because these materials are all porous substances and can attain favorable heat resistance, but also because if their characteristics are adapted they can double as the support material. Whether any of these is used is suitably determined according to the heat resistance required.

What requires the most care with regard to the preliminary combustion is a drop in the catalyst temperature due to air flow in the cylinder. For example, where the wind velocity in the axial direction within the cylinder due to the rise of the piston is 16 m/sec at NTP when the revolutions are 6,000 rpm and the compression ratio is 9, the pressure and temperature within the combustion chamber immediately prior to the end of the compression stroke are respectively estimated as approximately 15 kg/cm$_2$ and 250° C., therefore the air flow can be estimated as 2 m/sec. In this manner, although the air speed inside the cylinder fluctuates greatly, when the wind speed rises abruptly, the amount of diffused heat increases rapidly, the catalyst temperature drops and the catalyst does not ignite. As a result, concurrent heating by means of glow plugs or the like may be necessary.

Next, the main combustion will be explained. Essentially, the main combustion which generates engine power is performed by injecting fuel into the combustion chamber from injection nozzles close to the spark plugs immediately before the end of the compression stroke, and igniting it by means of the spark plugs. Since the interior of the combustion chamber has already been heated by the preliminary combustion, the effect of latent heat of vaporization can be ignored. For that reason, the fuel in the combustion chamber can be favorably combusted by flame propagation generated by the spark plugs.

In this manner, according to the method of the present invention, the combustion state within the combustion chamber can be made favorable and preventing the generation of knocking is possible. Also, as a result of the above, increasing the compression ratio and using inexpensive fuels with low ignition temperatures becomes possible. Note that an increase in the compression ratio results in a decrease in the wind speed during preliminary combustion, therefore it is advantageous with respect to the present invention. Also, naturally the respective conditions of the preliminary combustion and the main combustion are set by detecting and controlling the combustion states etc. thereof so that the optimum combustion states with respect to the entire cycle can be attained.

Embodiment 1

FIG. 1 is an overall view showing an example of an engine for realizing the method of the present invention, wherein 1 is a cylinder, 2 is a piston, 3 is a catalyst bed, 4 is an intake portion, 5 is a spark plug, 6 is both a preliminary combustion fuel injection and main combustion injection nozzle, 7 is a combustion chamber, 8 is a glow plug and 9 is an oil retaining wall for a lubricating oil. That is, the engine illustrated here is one provided with a catalyst bed 3 for preliminary combustion at the top land of the piston 2 and an injection nozzle 6, which spray injects fuel for the preliminary combustion and doubles as a main combustion injection nozzle, and has an adjustable spray rate. It has a structure which injects the fuel for main combustion into the combustion chamber 7 from the injection nozzle 6 in the vicinity of the spark plug 5. The glow plug 8 is for concurrent heating in cases where the temperature of the catalyst has decreased.

Figure 2A:
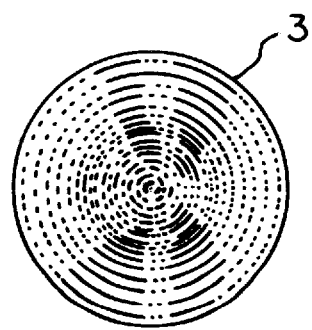
FIG. 2 comprises overall views of one side of a catalyst bed, (A) showing a hedgehog type catalyst bed made from stainless steel, and (B) showing a labyrinth type catalyst bed similarly made from stainless steel.
Figure 2B:
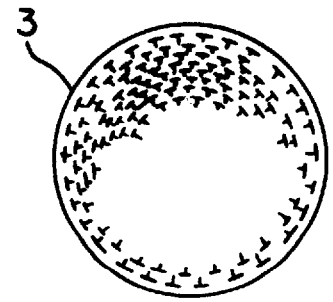

The catalyst bed 3 is constructed in an integrated form (monolith) from combustion catalyst and a support member which supports combustion catalyst. FIG. 2 illustrates an emodiment of the catalyst bed, (A) showing a hedgehog type catalyst bed made from stainless steel, and (B) showing a labyrinth type catalyst bed similarly made from stainless steel. As the catalyst metal component, palladium, platinum and the like can be employed. Also, as the carrier, a substance in which, for example, approximately 10 weight % of cerium is added as an oxide to g-alumina whose specific surface area is 100m$^2$/g, can be used. Further, in consideration of thermal deterioration due to mechanical and thermal shocks, Lewis number and radiation of flames during main combustion, the following combinations, for example, are more effective. That is, using a ceramic such as Siaron, zirconia or the like in the support material and using a heat resistant compound such as BaAl$_{12}$O$_{19}$,CaO·6Al$_2$O$_3$ and M$_x$·ZrO$_y$, etc., the specific surface area of which 50m$^2$/g or more after heating to 1100° C. or more, as the carrier. Where these heat resistant compounds are used, because they can also be used as support member materials, simplification of the structure of the catalyst bed is possible.

As a method for applying the combustion catalyst to the support material, although a mixed slurry of the catalyst metal component and the carrier can be applied to the support material by a wash coat method, it is possible to apply it by other publicly known general methods. As a method for installing the catalyst bed 3 on the head of the piston 2, a method of bonding a copper alloy layer to a stainless steel support material and burying this copper alloy layer in the top land of the piston 2 can be used. Also, even if the support material is a ceramic and/or heat resistant compound, the catalyst bed 3 can be installed in the head of the piston 2 by the same method.

Note that in FIG. 1, although the location of the combustion chamber 7 in which the catalyst bed 3 is installed is taken only as the top land of the piston 2, it is more effective for it to be installed over the entire effective surface area of the combustion chamber 7. Consequently, the area of the cylinder head portion in which it can be installed, in order to enlarge and multiply the number of the supply and exhaust valves, is very limited, and in addition due to it being located close to the position of the spark plug 5 where the arrival of the flame is fast, and its shape being a flat plate shape, since this is a section which is least likely to cause knocking, the significance of the installation of the catalyst bed 3 is not so great.

The method of the present invention is also applicable to an engine in which a device for radiating a laser beam is provided in the combustion chamber 7. This is because it is possible to reduce the activation energy of the fuel by a laser beam.

Embodiment 2

An g-alumina whose specific surface area is 120m$^2$/g is kneaded, a chloroplatinic acid—ammonium solution is impregnated into the carrier which is formed in a cylindrical shape, and after drying, is fired in air at 500° C. for three hours to attain a Pt/Al$_2$O$_3$ catalyst containing 0.5 weight % of platinum. Subsequently, this catalyst is milled and 0.5 cc (0.25 g) of the attained catalyst powder, whose particle diameter is 250 to 500 μm, is used as a sample, and the pertinent catalyst performances under the reaction conditions shown in Table 1 were measured using an ordinary normal pressure fixed once-through type reactor flow. Note that in the present embodiment a SUS316 made reactor tube whose inner diameter was 16 mm was used. Also, prior to measurement only industrial oxygen was supplied, and carbon (a reaction by-product) adhered to the catalyst bed was removed. Measurement was performed using a gas chromatograph (GC-14: made by Shimadzu Corp.) with TCD detector. The results of the conversion rates of n-pentane from the thus attained CO$_2$ are shown in FIG. 3.

Figure 3:
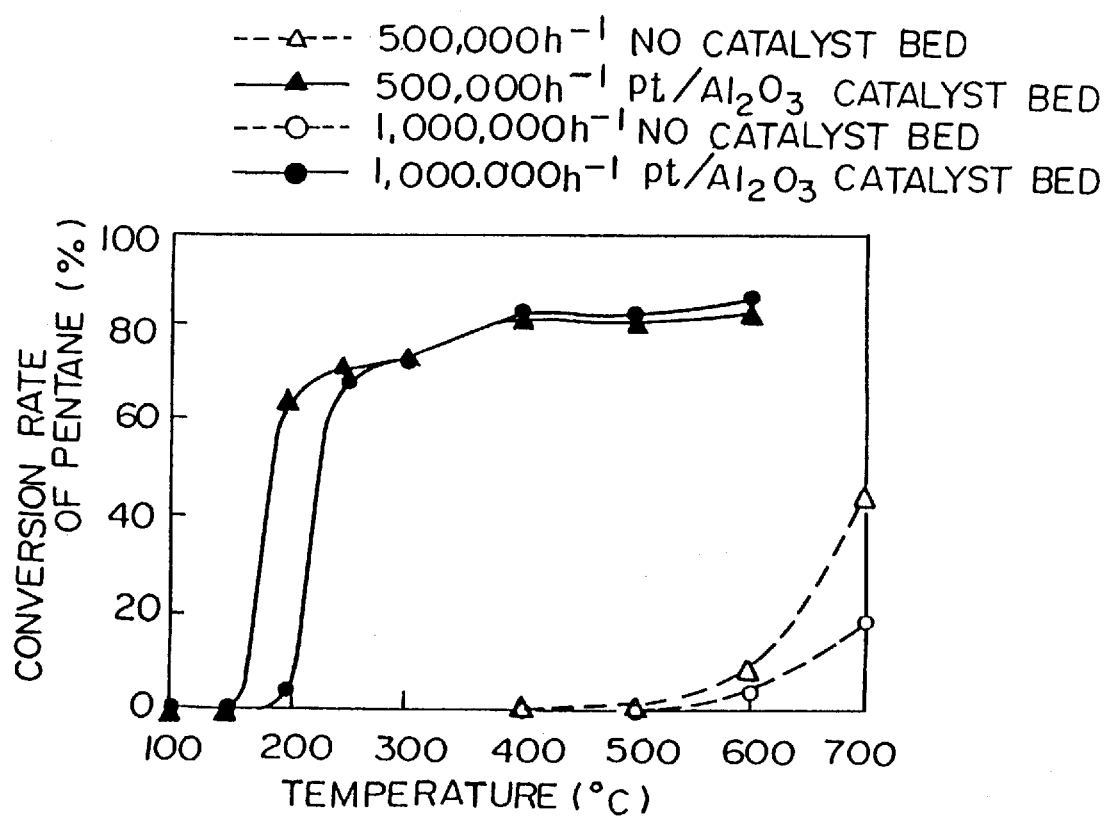
FIG. 3 is a chart showing the conversion rate of n-pentane in a second embodiment of the present invention.

From the results of FIG. 3 it can be understood that, in the case of the SV being 500,000h$^{-1}$, the combustion reaction speed over approximately 250° C. at the catalyst surface is the mass transfer rate controlling area.

TABLE 1

| Reaction gas composition | N-Pentane: 3211 ppm<br>Oxygen: 20.9%<br>Helium: remainder |
|---|---|
| Reaction gas flow rate | SV: 500,000 h$^{-1}$<br>SV: 1,000,000 h$^{-1}$ |
| Reaction pipe inlet gas temperature | 100–700° C. |
| Pentane supply during temperature rise/fall | None |

Next, using the above catalyst powder, the catalyst powder was reinforced on a hedgehog type stainless steel support material using a wash coating method, and a combustion test was performed under the engine test conditions shown in Table 2, using an engine of the structure shown in FIG. 1, the results of which are shown in Table 3. Note that although knocking occurs more readily when the fuel amount in the air-fuel mixture is less than a theoretical air-fuel ratio, i.e., lean, since in the combustion method of the present invention there is almost no possibility of causing knocking even under this type of condition, the air-fuel ratio in the present embodiment was adjusted and the test performed. Also, conditions other than the conditions shown in Table 3 to operate the engine were set to make the operating state most favorable under the conditions shown in Table 3. In Table 3, the O sign indicates a stable operating state without the occurrence of knocking, Δ indicates an operating state in which the frequency of knocking is low and there are no practical problems, and X indicates a state in which knocking frequently occurs and stable operation cannot be expected.

From the results of Table 3, it can be understood that, according to the method of the present invention, and a favorable combustion state can be maintained even when the air-fuel ratio is high at 22 and the engine is in a lean burn state. Note that a state where the air-fuel ratio is 22 and the ratio of preliminary combustion fuel is 15% is presumed to be a state in which knocking occurs due to premature ignition.

Also, after completion of the test, the engine was analyzed and the non-sliding wall surfaces examined, the results of which are that the catalyst bed completely maintained its original shape, and the surfaces were not contaminated, whereas the wall surfaces other than those of the catalyst bed had carbon attached to them and had become black. From these results, it can be understood that the catalyst bed sufficiently performs its functions.

TABLE 2

| Air-fuel ratio | 14.7 (normal),<br>22 (lean burn state) |
|---|---|
| Fuel used | Regular gasoline |
| Ratio of preliminary combustion fuel | 0, 1, 5, 10, 15% |
| Compression ratio | 9.0 |

TABLE 3

| Air-fuel Ratio<br>Ratio of preliminary combustion fuel (%) | 14.7 | | | | 22 | | | | |
|---|---|---|---|---|---|---|---|---|---|
| | 0 | 1 | 5 | 10 | 0 | 1 | 5 | 10 | 15 |
| Drive State Idling (500 rpm) | O | O | O | O | X | O | O | O | X |
| Unloaded acceleration (500 to 8000 rpm) | O | O | O | O | X | Δ | O | O | X |
| High speed - constant revs | O | O | O | O | X | O | O | O | O |
| Unloaded (8000 rpm) | O | O | O | O | X | O | O | O | O |
| Loaded operation (1500 rpm) | O | O | O | O | X | Δ | O | O | X |

Embodiment 3

Apart from using a three-way catalyst which is used in the prior art in automobile waste gas processing as the catalyst in the present embodiment, an engine test was performed similarly to Embodiment 2. The results thereof were approximately the same, knocking increasing somewhat more than in Embodiment 2 where the air-fuel ratio was 22 and the ratio of the preliminary combustion fuel was 1%, but decreasing somewhat over Embodiment 2 where the ratio of the preliminary combustion fuel was 15.

Embodiment 3

A diesel engine was improved to a structure similar to that of FIG. 1, regular gasoline was used as fuel and the engine was operated with a compression ratio of 22 and the ratio of preliminary combustion fuel set at 0 and 10%. The results were that, in the case where the ratio of the preliminary combustion fuel was 0%, knocking abnormally occurred due to premature ignition and an operatable state could not be achieved, whereas where the ratio of the preliminary combustion fuel was 10%, although there was slight knocking, there was no hindrance to operation.

As explained above, according to the method of the present invention, by separating preliminary combustion and main combustion of fuel, preliminary combustion becomes possible by a catalyst or the like and stable combustion at high air-fuel ratios can be attained, as a result of which there are the remarkable results that prevention of the occurrence of knocking can be achieved and economy can be improved, and in addition high compression ratios become possible.

What is claimed is:

1. A combustion method for an internal combustion engine which uses, as a method of combusting an air-fuel mixture in a combustion chamber, a multiple ignition method which injects part of a fuel used in one cycle into the combustion chamber, combusts (preliminary combustion) diluted air-fuel mixture below combustible limits at a temperature lower than a self-igniting temperature of the fuel, injects remaining fuel into the combustion chamber immediately thereafter, and combusts (main combustion) by flame propagation using spark plugs as ignition sources.

2. The combustion method for an internal combustion engine according to claim 1, wherein the preliminary combustion is performed using a catalyst bed formed from an active metal, a porous inorganic carrier and a support material.

3. The combustion method for an internal combustion engine according to claim 2, wherein the support material is any one of a hedgehog type and a labyrinth type.

4. The combustion method for an internal combustion engine according to claim 2, wherein any one of stainless steel and a ceramic is used as a material of the support material.

5. The combustion method for an internal combustion engine according to claim 2, wherein the porous inorganic carrier is mainly comprising of any one of activated alumina and a heat resistant compound.

6. The combustion method for an internal combustion engine according to claim 2, wherein a noble metal is used as the active metal.

7. The combustion method for an internal combustion engine according to claim 4, wherein the ceramic is at least one type selected from a group consisting of Siaron and zirconia.

8. The combustion method for an internal combustion engine according to claim 5, wherein the heat resistant compound is at least one type selected from a group consisting of $BaAl_{12}O_{19}$, $CaO \cdot 6Al_2O_3$ and $M_x \cdot ZrO_y$.

9. A combustion method for an internal combustion engine which takes 1 to 10% of fuel used in one cycle as a diluted air-fuel mixture which is ten or a multiple of ten times a theoretical air-fuel ratio and, immediately prior to the end of a compression stroke which is slightly before a piston reaches upper dead center, combusts a remaining portion of the fuel immediately prior to injection into a combustion chamber by means of a catalyst bed maintained at a temperature of 300° to 500° C. (preliminary combustion), then immediately thereafter injects the remaining portion of the fuel into the combustion chamber to ignite and combust it (main combustion).

10. The combustion method for an internal combustion engine according to claim 9, wherein the preliminary combustion is performed using a catalyst bed comprising of an active metal, a porous inorganic carrier and a support material.

11. The combustion method for an internal combustion engine according to claim 10, wherein the support material is any one of a hedgehog type and a labyrinth type.

12. The combustion method for an internal combustion engine according to claim 10, wherein any one of stainless steel and a ceramic is used as a material of the support material.

13. The combustion method for an internal combustion engine according to claim 10, wherein the porous inorganic carrier is mainly comprising of any one of activated alumina and a heat resistant compound.

14. The combustion method for an internal combustion engine according to claim 10, wherein a noble metal is used as the active metal.

15. The combustion method for an internal combustion engine according to claim 12, wherein the ceramic is at least one type selected from a group consisting of Siaron and zirconia.

16. The combustion method for an internal combustion engine according to claim 13, wherein the heat resistant compound is at least one type selected from a group consisting of $BaAl_{12}O_{19}$, $CaO \cdot 6Al_2O_3$ and $M_x \cdot ZrO_y$.

* * * * *